Nov. 5, 1940.  R. K. HELLMANN  2,220,602
DEVICE FOR LOGARITHMIC MEASUREMENT OF VOLTAGES
Filed July 13, 1938
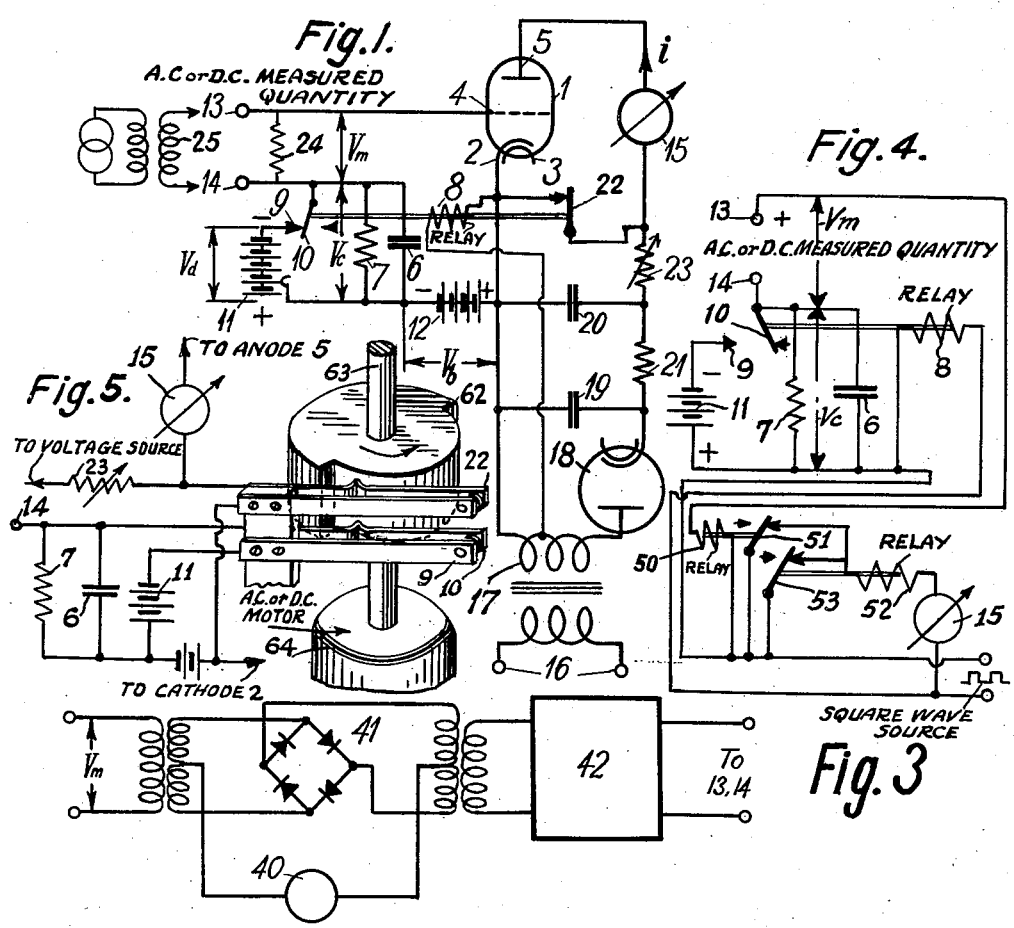
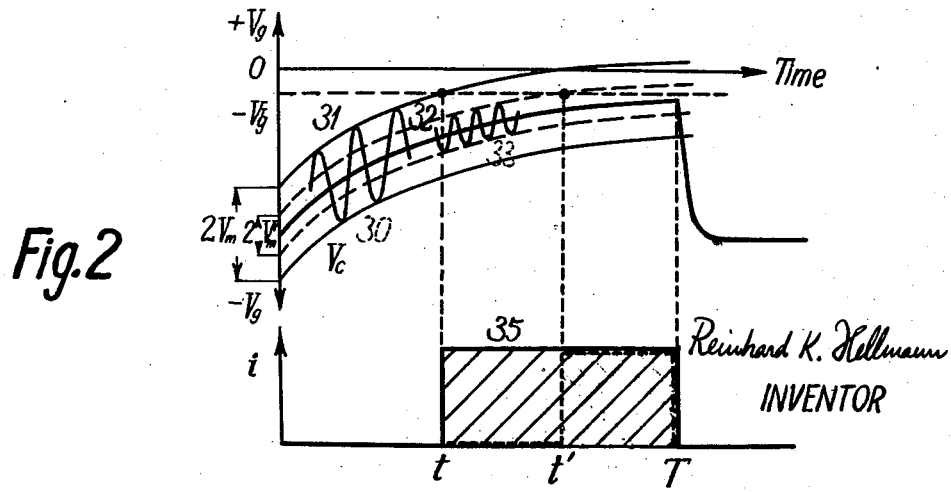
Reinhard K. Hellmann
INVENTOR Patented Nov. 5, 1940

2,220,602

UNITED STATES PATENT OFFICE 2,220,602

DEVICE FOR LOGARITHMIC MEASUREMENT OF VOLTAGES

Reinhard K. Hellmann, Meriden, Conn.

Application July 13, 1938, Serial No. 218,932
In Germany February 15, 1936

9 Claims. (Cl. 171—95)

My invention relates to the measurement of voltages of varying magnitude in such a way that the exact logarithm of the voltage to be measured is indicated on the scale of the instrument. The voltage to be measured may be either D. C. or A. C. of any frequency.

The known devices for the logarithmic measurement of voltages employ either variable-mu tubes, which have an approximately exponential characteristic, or non-linear resistances, such as copper-oxide rectifiers, combinations of variable electronic and fixed ohmic resistances or mechanically actuated potentiometers of more or less elaborate design.

The practical requirements for a logarithmic measuring instrument are: a wide range of amplitudes covered by the logarithmic scale with deviations as small as possible from an exact logarithmic law; a wide or adaptable frequency range; further, a fast upswing with little overshot of the pointer or recorder; and finally, an output power great enough for operating a recording instrument directly connected with the device. Moreover, complicated mechanical parts should be avoided.

It is the main object of my invention to provide means which meet the requirements outlined above much better than the known devices, and to accomplish this by an arrangement which consists essentially of parts conventionally used in audio and high frequency engineering.

Another object of the invention is to provide highly sensitive means for indicating an unusually wide range of amplitudes, the ratio of which may be considerably greater than 1:100, and the values of which may be read on a scale which has practically no deviations from a strictly logarithmic law.

A further object of my invention is to provide an indicating or recording speed great enough to indicate or record voltage fluctuations such as originated by speech, music, noise of rapidly varying intensity, etc., if such measurements are required. The voltage to be measured may be indicated by means of an instrument or a recorder of conventional or special design, on the screen of a cathode ray tube, on a spark recorder, or on any other suitable device. Though in this description only indicating and recording devices are referred to, all principles disclosed are also applicable when these devices are replaced by other current-operated apparatus, such as regulating and control devices.

The accompanying drawing illustrates the invention diagrammatically by way of example, and shows in Fig. 1 the circuit diagram of a measuring device according to the invention; Fig. 2 is of explanatory nature and exemplifies the working characteristics of the arrangement according to Fig. 1; and Fig. 3 represents the simplified circuit diagram of an attachment suitable for extending the frequency range of the device shown in Fig. 1 to very low frequencies. Figs. 4 and 5 exemplify two other embodiments.

The arrangement shown in Fig. 1 contains a tripping device in the form of a gas discharge tube 1 of the Thyratron type, with the cathode 2, heater 3, control grid 4, and anode 5. In the grid circuit between grid 4 and cathode 2, a condenser 6, the capacity of which is C, is connected in parallel with a resistor 7 of resistance R. The condenser is charged periodically from a battery 11 through a contact device having a stationary contact 9 and a movable contact 10. Contact 10 is actuated by a polarized relay 8, the coil of which is connected with a transformer 17 representing an auxiliary A. C. source. Thus, the condenser 6 is charged while the contact reed 10 is in its left position, and is discharged through the resistor 7 as soon as the contact opens. The grid circuit of tube 1 has terminals 13 and 14 to be connected with the source of the voltage to be measured. The connection should preferably form a D. C. path across the terminals, as is the case if the output winding of a transformer or a suitable ohmic resistor, such as indicated by 24, is connected across the terminals 13, 14. The grid circuit may further contain, depending on the control characteristic of the Thyratron used, a bias battery 12.

The plate circuit of tube 1, this circuit extending between anode 5 and cathode 2 and representing the indicating circuit proper, contains an instrument 15, preferably of the moving coil type, for instance an ink recorder, and is connected with an auxiliary power supply consisting of the secondary winding of transformer 17, which is connected with its primary terminals 16 to the A. C. mains. The indicating or plate circuit further contains a rectifier 18, means for filtering the rectified current 19, 20, 21, a pair of contacts 22 and an anode resistor 23. The contacts 22 are actuated from the same relay 8 that drives the contact reed 10, but are statically shielded from the latter. If 10 is in its left position, the contact 22 is closed. As soon as 10 opens, 22 is also opened, thus bringing about a periodical voltage of rectangular shape and in strict synchronism with the grid circuit conductivity, across the anode of the Thyratron.

Fig. 2 illustrates the working principle of the device. Let us assume that contact 9, 10 just opens. The condenser 6 has been charged negatively with the voltage $V_d$ and now discharges according to an exponential law, the instantaneous voltage $V_c$ across 6 being $$V_c = -V_d \cdot e^{-t/RC}$$

Let us further assume that the frequency of the voltage to be measured is either 0 (D. C. connected with plus to 13), or very high compared to the frequency at which the condenser is charged and discharged. If $V_m$ is the value of the D. C. voltage or the peak value of the A. C. voltage to be measured, the total voltage across the grid of the tube 1 resulting from the superposition of $V_c$ and $V_m$ reaches very frequently its minimum value $$V_g = -V_d \cdot e^{-t/RC} + V_m - V_b$$

This envelope, shown as 31 in Fig. 2, intersects the line $V_b$ at the time $$t = RC(\ln V_d - \ln V_m)$$

Now, $V_d$ is made equal to the tripping voltage V of the thyratron, and therefore anode current $i$ begins to flow from the instant $t$, its magnitude being essentially given by the anode voltage and the resistance in the circuit. At the instant T, the reed 10 returns to its left position in order to recharge the condenser. At the same time 22 closes, thereby interrupting the current $i$. As will be seen from curve 35, Fig. 2, the amount of electricity indicated by the shaded area flows during the period $t-T$, and as this is repeated continuously, according to the rhythm of the A. C. power supply, a certain deflection is caused at the instrument 15 as long as the value of $V_m$ is unchanged. The length of the shaded rectangle is $T-t$ and hence proportional to the logarithm of $V_m$, as is readily seen from the above expression for $t$.

If the amplitude of the alternating or the direct voltage to be measured becomes smaller, the envelope of $V_m$ intersects the $V_b$ axis later (see curve 32 in Fig. 2), so that the time elapsing until the moment of the tripping is increased to $t'$, by exactly the logarithm of the voltage quotient $V_m/V_m'$. The electric charge flowing through the instrument 15 is now indicated by the smaller, double-shaded area, and it appears that the deflection caused at the instrument shows the same logarithmic relationship. It is apparent that this effect is not due to a more or less incidental and approximate logarithmic relationship, but is produced by utilizing means which follow a strictly logarithmic law and which can easily be reproduced with a high degree of accuracy.

The smallest voltage that may be used to ignite the thyratron is limited only by the small unavoidable changes of the control characteristic of the conventional types of thyratrons, and is of the order of tenths of volts. Smaller voltages can be measured, if a suitable amplifier is used. The maximum value $V_d$ which is applicable for charging the condenser 6 may be as great as a hundred or several hundreds of volts. The range of voltages to be measured may therefore well exceed the ratio of 1:100.

Instead of a thyratron as shown in Fig. 1, other tripping devices may be used, such as other types of electronic devices or relays, in particular if the periodical charging and discharging of the condenser network occurs at a low frequency. Fig. 4 shows, for instance, an arrangement in which the thyratron is replaced by the exciting coil 50 of a sensitive relay 51. As soon as the sum of voltages $V_c$ and $V_m$ reaches the value 0, the relay 51 closes the indicating circuit of instrument 15 temporarily. The indicating circuit contains a relay 52 of the holding type, i. e., the temporary actuation of relay 52 through the sensitive relay 51 causes the contact 53 of the holding relay to bridge relay 51 and to stay energized and closed so long as the indicating circuit remains energized. Hence, the auxiliary current flows through the instrument 15 from the instant when relay 51 trips until the contact 22 disconnects the voltage supply and restores the initial conditions in a manner similar to that previously described.

The circuit control means for periodically charging and discharging the impedance network or the synchronization of the circuit control means in the grid and plate circuits may also be accomplished by means other than those above mentioned. Fig. 5, for instance, shows an arrangement in which two sets of contacts 10 and 22 controlling the grid or impedance network and the plate or indicating circuit, respectively, are operated by a cam 62. The cam shaft 63 is driven by an A. C. or D. C. motor 64. In this case, the readings are independent of the speed of the motor. This type of apparatus is particularly advisable when the measuring device is to be used in connection with some mechanism that already contains parts rotating at constant speed, such as sound recording and playback equipment, certain kinds of audio frequency spectrometers, etc.

Also, the means employed in the device according to Fig. 1 for producing the required rectangular form of the anode voltage is not essential for the operation, any other means of securing an anode voltage, the shape of which is closely rectangular, being suitable for the purpose.

As may be seen from Fig. 2, the ratio of the frequency at which the relay 8 is operated, and of the lowest frequency of the voltage to be measured, if the latter is an alternating voltage, affects the accuracy of the readings. With the relay frequency being 60 cycles, for instance, the lowest frequency measured should be a multiple of 60, so that peaks occur sufficiently often to ignite the thyratron at the correct moment. A wide range of frequencies, starting from very low values, however, may be obtained by modulating a carrier frequency with the voltage to be measured, according to one of the well-known suppressed-carrier methods. Such a circuit is shown diagrammatically in Fig. 3. Here, 40 is the carrier frequency generator 41 the modulator of the balanced rectifier bridge type, and 42 a filter which may be used for passing only one of the side-bands produced in the modulator. This side-band is then applied to the input 13, 14.

The calibration of the apparatus may be accomplished by replacing the voltage to be measured with a known voltage, preferably tapped from a section of the battery 11. Then, the pointer of the instrument should reach a previously determined calibration mark. Corrections may be made either by adjusting the resistor 23 or the voltage $V_d$ of battery 11.

It may be mentioned that scales other than logarithmic can be obtained by replacing the resistor 7 with a non-linear resistance, such as a copper-oxide rectifier. This results in deviations from the exponential law during the discharge of the condenser and consequently in a different scale.

I claim:
1. In an arrangement for the logarithmic measurement of voltages of varying magnitude, the combination of a condenser connected in parallel with a resistance, an adjustable source of D. C. voltage connected with said condenser through relay contacts in such a way that said condenser is periodically and at a predetermined frequency charged from said source of voltage and discharged through said resistance, means for series connecting the source of said voltage to be measured with said condenser, a thyratron tube having a control grid which is connected with the circuit comprising the aforesaid elements so as to make the thyratron conductive when the sum of said voltage to be measured and the voltage across said condenser reaches a predetermined value, an indicating circuit connected with the plate of said thyratron and comprising an indicating instrument, an A. C. power supply, a power rectifier, filter system, and another set of contacts capable of removing the rectified voltage from said indicating circuit, and means for actuating both sets of contacts in synchronism in such a way that said rectified voltage is connected with the indicating circuit during the period when said condenser is disconnected from said adjustable source of voltage.

2. An arrangement for the logarithmic measurement of voltages, comprising a network including a capacitance, a resistance connected with said capacitance so as to form a discharge path for said capacitance, current supply means for charging said capacitance with direct current, and circuit control means for intermittently connecting said supply means with said capacitance so as to effect a periodical charging and discharging of said capacitance, in combination with an indicating circuit connected with said network and including an auxiliary current source, a measuring device, a tripping device having voltage-responsive control means for causing said measuring device to be energized by said auxiliary current source in dependence upon the voltage of said control means reaching a given magnitude, and circuit control means for alternately rendering said indicating circuit operative and inoperative, in further combination with actuating means for periodically operating said circuit control means of said network in synchronism with said circuit control means of said indicating circuit so as start discharging said capacitance simultaneously with rendering said indicating circuit operative, and means for supplying the voltage to be measured to said network and said voltage-responsive control means to bias said latter control means by a resultant voltage depending upon both the discharge voltage and the voltage to be measured, whereby said measuring device is energized upon said resultant voltage reaching said given magnitude during each discharge period of said capacitance.

3. An arrangement for the logarithmic measurement of voltages, comprising an impedance network of given time constant, means for supplying a charging current of constant DC voltage to said network, and circuit control means for intermittently connecting said supply means with said network so as to periodically charge and discharge said network, in combination with an indicating circuit connected with said network and including an auxiliary current source, a measuring device, a tripping device having voltage-responsive control means for causing said measuring device to be energized by said auxiliary current source in dependence upon the voltage of said control means reaching a given magnitude, and circuit control means for alternately rendering said indicating circuit operative and inoperative, in further combination with actuating means for periodically operating said circuit control means of said network in synchronism with said circuit control means of said indicating circuit so as to start discharging said impedance network simultaneously with rendering said indicating circuit operative, and means for supplying the voltage to be measured to said network and said voltage-responsive control means to bias said latter control means by a resultant voltage depending upon both the discharge voltage and the voltage to be measured, whereby said measuring device is energized upon said resultant voltage reaching said given magnitude during each discharge period of said network.

4. In an arrangement for the logarithmic measurement of voltages of varying magnitude, the combination of, an impedance network capable of being periodically discharged and charged with a predetermined frequency and time constant, a constant DC voltage source for charging said impedance network, circuit control means disposed between said voltage source and said network for periodically connecting said voltage source with said network so as to alternately charge and discharge said network, means for series-connecting the source of the voltage to be measured with said network, an indicating circuit including an auxiliary voltage source for energizing said indicating circuit, an electronic valve having a plate circuit connected with said indicating circuit and a control grid arranged so as to suddenly start a current to flow in said indicating circuit when the sum of the voltage of said network and said voltage to be measured reaches a predetermined value, and circuit control means for periodically removing said auxiliary voltage from said indicating circuit in synchronism with the charging and discharging of said network.

5. In an arrangement for the measurement of voltages of varying magnitude, the combination of an impedance network capable of being periodically charged and discharged and having a given time constant, direct current supply means of constant voltage for charging said impedance network, a contact device for alternately connecting and disconnecting said current supply means and said network, means for series-connecting the source of said voltage to be measured with said network, an indicating circuit including a rectifier, a filter system, and an AC power supply for energizing said indicating circuit through said rectifier and said filter system, a voltage-controlled tripping device disposed in said indicating circuit for causing a current to flow in said indicating circuit during a certain fraction of each discharging period of said network from the moment when the combination of the voltage of said network and said voltage to be measured reaches a predetermined value, a second contact device associated with said indicating circuit for alternately removing and restoring the connection of said AC power supply with said indicating circuit, and electromechanical means for actuating said two contact devices in synchronism with each other so as to establish the discharge condition of said network during periods when said AC voltage supply is connected with said indicating circuit.

6. In an arrangement for measuring variable voltages, in combination, an impedance network capable of storing and discharging direct current at a given rate of change, periodically operating circuit control means for alternately charging and discharging said network at given intervals, means for impressing the voltage to be measured on said network in order to produce a resultant control voltage depending upon both the voltage of said direct current and said voltage to be measured, an indicating circuit, a voltage-controlled tripping device disposed in said indicating circuit and connected with said network so as to be controlled by said resultant voltage, an auxiliary A. C. voltage source connected with said indicating circuit to energize said circuit upon the tripping of said device, circuit control means associated with said indicating circuit for interrupting said energization, and actuating means connected with said auxiliary voltage source for synchronously operating said circuit control means of said network and said circuit control means of said indicating circuit so as to start discharging said network at an instant when said indicating circuit is in operative condition and rendering said indicating circuit inoperative at the end of a predetermined period after said starting moment.

7. In an arrangement for measuring variable voltages, in combination, an impedance network capable of storing and discharging direct current at a given rate of change, a direct current source of constant voltage for charging said network, a periodically operating polarized relay having an exciting coil and two separate sets of contacts synchronously operated by said coil, one of said sets of contacts being disposed between said direct current source and said network in order to alternately charge and discharge said network at given intervals, means for impressing the voltage to be measured on said network in order to produce a resultant control voltage depending upon both the voltage of said direct current and said voltage to be measured, an indicating circuit, a voltage-controlled tripping device disposed in said indicating circuit and connected with said network so as to be controlled by said resultant voltage, an auxiliary A. C. voltage source connected with said indicating circuit to energize said circuit upon the tripping of said device, said second set of contacts being connected with said indicating circuit for interrupting said energization, and said relay coil being connected with said auxiliary current source so that said indicating circuit is placed in operative condition by said second set of contacts when said first set is moved into position for discharging said network.

8. In an arrangement for measuring variable voltages, in combination, an impedance network capable of storing and discharging direct current at a given rate of change, direct current supply means for charging said network, a periodically operating contactor having two sets of synchronously operating sets of contacts, one of said sets of contacts being connected with said network to alternately charge and discharge said network at intervals of fixed length, means for impressing the voltage to be measured on said network in order to produce a resultant control voltage depending upon both the voltage of said direct current and said voltage to be measured, an indicating circuit, a discharge device controlled by said resultant voltage and connected in said indicating circuit for tripping said circuit upon said resultant voltage exceeding a predetermined magnitude, and an auxiliary current source, said other set of contacts of said contactor being connected with said indicating circuit and said auxiliary current source for periodically rendering said circuit operative during intervals of fixed length which include the starting moment of the discharge of said network and the tripping of said discharge device, said intervals being a multiple of the periods of the voltage variations to be measured.

9. In an arrangement for the logarithmic measurement of voltages of varying magnitude, the combination of, an impedance network capable of being periodically charged and discharged with a predetermined frequency and time constant, means for intermittently supplying said network with direct current from a fixed DC voltage source for alternately charging and discharging said network, an electric transducer having its output terminals series-connected with said network and its input terminals connected with the source of the voltage to be measured so as to transfer the frequency band of said voltage to be measured to a frequency range suitable for an accurate indication of the logarithm of said voltage to be measured, an indicating circuit including an auxiliary source of voltage, a voltage-responsive tripping device for causing a current to flow in said indicating circuit during a certain fraction of each discharging period from the moment when the combination of the voltage of said network and the voltage to be measured reach a predetermined value, and circuit control means for periodically rendering said indicating circuit ineffective in synchronism with the charging and discharging of said network.

REINHARD K. HELLMANN.